United States Patent
Kitaguchi

(10) Patent No.: US 7,085,262 B2
(45) Date of Patent: Aug. 1, 2006

(54) TELECOMMUNICATION SYSTEM

(75) Inventor: Hideaki Kitaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 954 days.

(21) Appl. No.: 10/006,359

(22) Filed: Dec. 10, 2001

(65) Prior Publication Data

US 2002/0071428 A1    Jun. 13, 2002

(30) Foreign Application Priority Data

Dec. 8, 2000    (JP) .............................. 2000-374122

(51) Int. Cl.
*H04L 12/66* (2006.01)
(52) U.S. Cl. ...................................... 370/352; 709/203
(58) Field of Classification Search ......... 370/352–357
See application file for complete search history.

(56) References Cited

U.S. PATENT DOCUMENTS

| | | | | |
|---|---|---|---|---|
| 5,995,606 A | * | 11/1999 | Civanlar et al. | 379/207.13 |
| 6,584,094 B1 | * | 6/2003 | Maroulis et al. | 370/352 |
| 6,781,983 B1 | * | 8/2004 | Armistead | 370/353 |
| 2004/0160951 A1 | * | 8/2004 | Galvin et al. | 370/352 |

FOREIGN PATENT DOCUMENTS

| | | |
|---|---|---|
| JP | 09-252486 | 9/1997 |
| JP | 10-117238 | 5/1998 |
| JP | A 10-336349 | 12/1998 |
| JP | 11-508430 | 7/1999 |
| JP | A 11-508430 | 7/1999 |
| JP | 11-308366 | 11/1999 |
| JP | A 11-346266 | 12/1999 |
| JP | 2000-134366 | 5/2000 |
| JP | A 2000-134336 | 5/2000 |
| JP | 2000-253180 | 9/2000 |

* cited by examiner

*Primary Examiner*—Chau Nguyen
*Assistant Examiner*—Christopher Grey
(74) *Attorney, Agent, or Firm*—Young & Thompson

(57) ABSTRACT

A client receives a menu from a web server in a corporation and specifies a post of a corporation through which the client wishes to consult the corporation. The web server transfers information of the specified post to a switching system disposed in the corporation to allow the switching system to extract an extension for the post and transfers the telephone number of the extension via the web server to the client. The client can originate a call onto the telephone number by clicking thereof without inputting the telephone number.

9 Claims, 3 Drawing Sheets

FIG. 3A
INITIAL SCREEN

[XXX AUTO. INSURANCE WEB ATTENDANT]

THANK YOU FOR CALLING
"PLEASE SELECT ONE OF FOLLOWING MENUS"

① CONSULTATION POST
② CONTENTS OF CONTRACT
③ RECEIPT OF ACCIDENT

```
<HTML><HEAD>
<TITLE>[XXX AUTO. INSURANCE WEB ATTENDANT] </TITLE></HEAD>
<BODY>
<P><DIV ALIGN = CENTER> THANK YOU FOR CALLING <BR>
<P><DIV ALIGN = CENTER> PLEASE SELECT ONE OF FOLLOWIN MENES
驪<A HREF p1 html ACCESSKEY = 1>CONSULATION POST </A><BR>
麗<A HREF p2 html ACCESSKEY = 2>CONTENTS OF CONTRACT </A><BR>
黎<A HREF p3 html ACCESSKEY = 3>RECEIPT OF ACCIDENT
```

FIG. 3B
CONNECTION ACCEPTANCE SCREEN

[XXX AUTO. INSURANCE WEB ATTENDANT]

TELEPHONE NUMBER OF CONSULTATION POST
0471-XX-XXXX
DO YOU CONNECT ?

[YES]   [NO]

FIG. 3C

[XXX AUTO. INSURANCE WEB ATTENDANT]

"CALLING ONTO CONSULTATION POST."
PLEASE WAIT IN A TELEPHONE MODE

TELECOMMUNICATION SYSTEM

BACKGROUND OF THE INVENTION (a) Field of the Invention

The present invention relates to a telecommunication system and, more particularly, to the technique for controlling connection between a switching system and a plurality of communication terminals in a telecommunication system such as including the internet packet communication network and a circuit-switched communication network. The present invention also relates to a telecommunication control method and system for use in such a telecommunication system.

(b) Description of the Related Art

It is usual for a subscriber of a telecommunication system to ask for a telephone number by using a communication terminal such as a general subscriber's telephone system or a mobile telephone system before originating a call to the telephone number. Such an inquiry is generally performed by using a telephone number directory service offered by a carrier, using a data base retrieval service offered by a carrier such as "Angel Line", or using a homepage on the internet such as offered by NTT Corporation in its "i-mode" system.

The method for originating a call while using the telephone number directory service includes the steps of requesting the telephone number of an operator by voice, recording on a paper the telephone number uttered by the operator, and then inputting the recorded telephone number onto the own communication terminal for coupling to the telephone number.

The method for originating a call while using the data base retrieval service includes the steps of dial-up accessing to the data base by using a personal computer on which a dedicated retrieval software runs, performing the retrieval in the data base, recording the retrieved telephone number, and inputting the recorded telephone number onto the own communication terminal for coupling to the telephone number.

Both the above methods necessitate, as described above, the duplicate steps of recording the telephone number on some medium and inputting the telephone number with reference to the recorded telephone number.

The method for originating a call while using the homepage on the internet includes the steps of coupling the own communication terminal, such as a mobile phone, to the internet, accessing the homepage offered by the corporation having the telephone number which is desired for connection, and coupling to the telephone number set in the content provided on the homepage.

The method for originating a call while using the homepage on the internet is relatively convenient because the call is connected without inputting the telephone number by the subscriber, thereby obviating a wrong input. However, this function is only limited to the connection to the telephone number itself. More specifically, it is impossible to display the telephone number or the information from the telephone number on the own communication terminal, when the call is being connected to the extension of the telephone number or the switching system accommodating the extension of the telephone number, or after the call is connected to the extension or the switching system.

SUMMARY OF THE INVENTION

In view of the above problems in the conventional techniques, it is an object of the present invention to provide a telecommunication system which is capable of allowing a subscriber or client to connect the own communication terminal to the extension of the telephone number desired for connection in a switching system without duplicate or complicated input of the telephone number.

It is another object of the present invention to provide a telecommunication system which is capable of allowing the telephone number or the information from the telephone number to be displayed on the screen of the communication terminal even when the call is being connected to the extension of the telephone number or the switching system or after the call is connected to the extension of the telephone number or the switching system.

It is another object of the present invention to provide a telecommunication control method and a telecommunication control system in a telecommunication system such as described above.

The present invention provides a telecommunication system including: a web server and a switching system disposed in combination for data transmission therebetween, the switching system accommodating therein a plurality of extensions, the web server storing therein first screen data for specifying therein at least one menu having post information and second screen data; and a plurality of communication terminals each including a packet interface connected to the web server via an internet packet communication network and a line interface connected to the switching system via a circuit-switched communication network, each of the communication terminals including a display unit, a web browser for accessing the web server to receive therefrom the first and second screen data to be displayed on the display unit, and an input section for specifying the menu on the display unit, the web browser transmitting to the web server information of the menu specified by the input section, the web server including a data transfer section for transferring to the switching system information of the menu specified by the input section, the switching system including a connection monitor for monitoring connection of the extensions to select one of the extensions based on the information of the menu specified and transmit to the web server a telephone number of the selected one of the extensions to be included in the second screen data, the browser urging a client to originate a call onto the telephone number in the second screen data.

The present invention also provides a method for controlling a telecommunication system including at least one combination of a web server and a switching system, the web server being connected to a plurality of communication terminals via an internet packet communication network, the switching system being connected to the plurality of communication terminals via a circuit-switched communication network and accommodating a plurality of extensions, the method including the steps of: allowing the web server to display first screen data on a display unit of one of the communication terminals, aid first screen data including information of at least one post; allowing the web server to respond to first information that the post is specified in the first screen data, to transfer the first information to the switching system; allowing the switching system to extract one of the extensions corresponding to the specified post based on the first information and to transmit a telephone number of the one of the extensions to the web server; allowing the web server to transmit second screen data including information of the telephone number to the one of the communication terminals; and urging a client to originate a call onto the telephone number in the second screen data via the circuit-switched communication network and the switching system.

The present invention further provides a telecommunication control system including: a web server and a switching system disposed in combination for data transmission therebetween, the switching system accommodating therein a plurality of extensions, the web server storing therein first screen data for specifying therein at least one menu having post information and second screen data, the web server being connected to a plurality of communication terminals via an internet packet communication network, the switching system being connected to the plurality of communication terminals via a circuit-switched communication network, the web server including: a data transmission section for transmitting the first and second screen data to be displayed on a display unit of one of the communication terminals, the first screen data urging the one of the communication terminals to specify the menu on the display unit, the data transmission section receiving information of the menu specified from the one of the communication terminals to transfer the information of the menu specified to the switching system, the switching system monitoring connection of the extensions to select one of the extensions based on the information of the menu specified and transmit to the web server a telephone number of the selected one of the extensions to be included in the second screen data, the web server transferring the second screen data to the one of the communication terminals to urge the same to specify the telephone number in the second screen data to allow the one of the communication terminals to connect via the switching system to the selected one of the extensions based on the telephone number.

In accordance with the telecommunication system and telecommunication control method and system of the present invention, the client can originate a call to an extension of a telephone number without inputting the telephone number by the function of the web server and the switching system.

The above and other objects, features and advantages of the present invention will be more apparent from the following description, referring to the accompanying drawings.

BRIEF DESCRIPTION OF THE DRAWINGS

FIGS. 3A to 3C are images of screen on the display unit of the communication terminal in the telecommunication system of FIG. 1, attached with HTML (hyper link markup language) tags.

PREFERRED EMBODIMENT OF THE INVENTION

Figure 1:
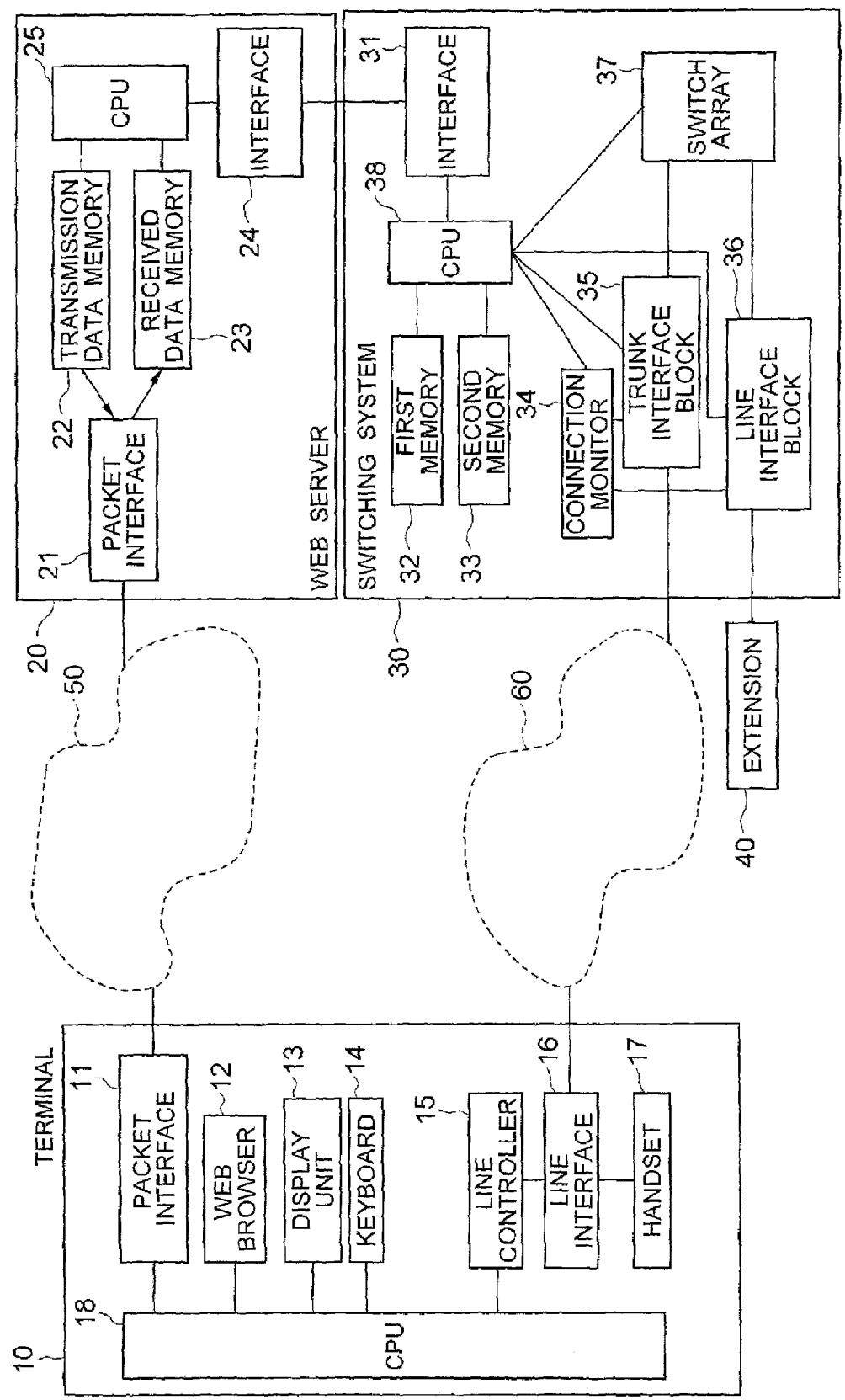
FIG. 1 is a block diagram of a telecommunication system according to an embodiment of the present invention.
Figure 2:
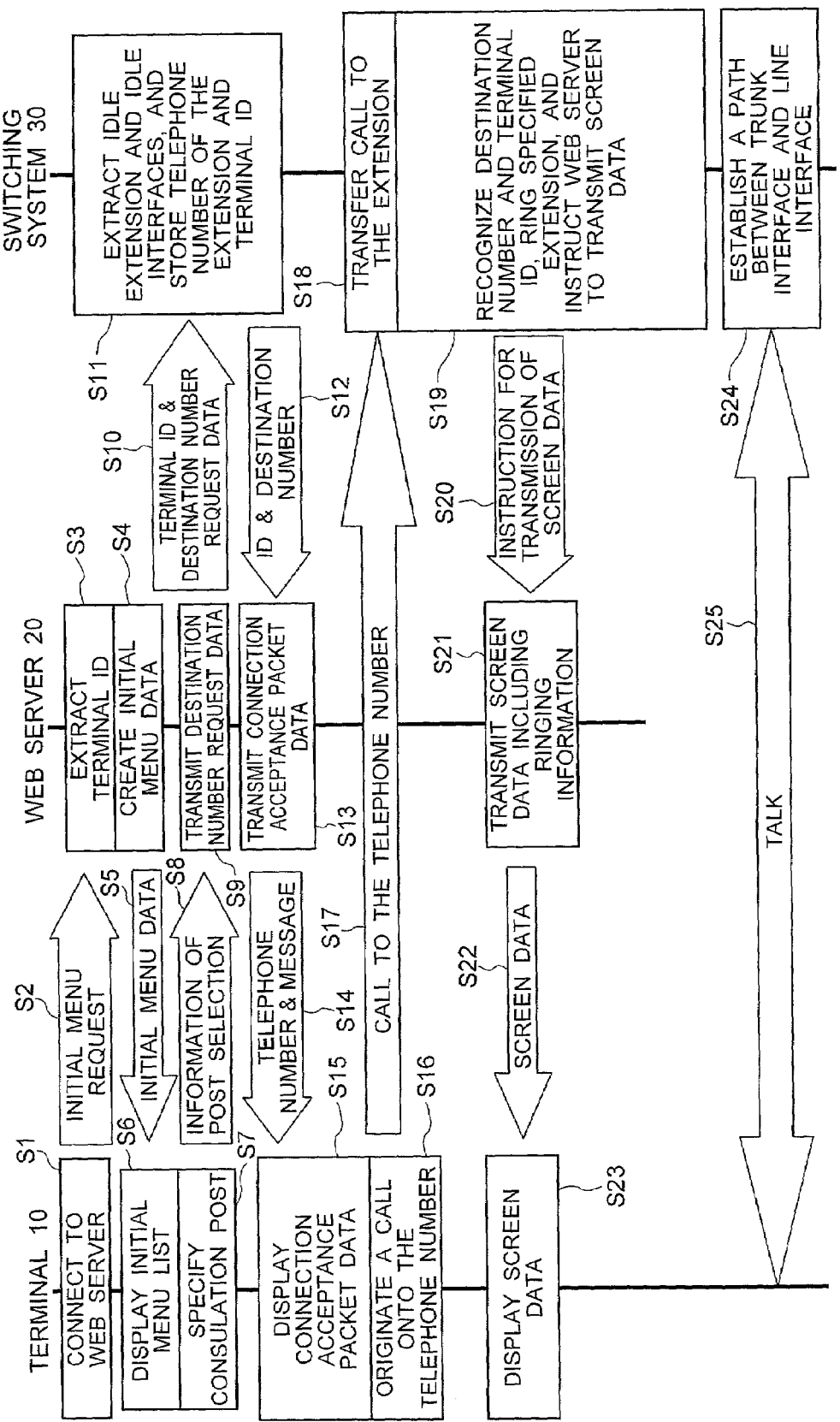
FIG. 2 is a schematic flowchart for the operation of the telecommunication system of FIG. 1.

Referring to FIG. 1, a telecommunication system according to an embodiment of the present invention includes a plurality of communication terminals 10, and a plurality of combinations of web server 20 and switching system 30 disposed in corporations, for example. Each communication terminal 10 is connected to the web server 20 via the internet packet communication network 50, whereas the each communication terminal 10 is connected to the switching system 30 via the circuit-switched communication network 60. The switching system 30 and the web server 20 are connected together via respective dedicated interfaces 31 and 24 to form a telecommunication control system. A plurality of extensions 40 are accommodated in the switching system 30 which is disposed for switching the communication network 60. The extensions 40 may be disposed outside the corporation, and may be connected to the switching system 30 by using a tandem connection scheme.

The communication terminal 10 can be connected to the extension 40 accommodated in the switching system 30 by using the functions of the switching system 30 and the web server 20. The communication terminal 10 includes a packet interface 11 for connecting to the internet packet communication network 50, a web browser 12, a display unit 13, a keyboard 14 etc. for inputting desired information therefrom, a line controller 15, a line interface 16 for connecting to the circuit-switched communication network 60, a handset 17 for inputting/outputting voice for transmission, and a central processing unit (CPU) 18 for controlling the overall operations of the constituent elements in the communication terminal 10.

The web server 20 includes a packet interface 21 for connecting to the internet packet communication network 50, a transmission data memory 22 for storing the data for transmission 5 through the packet interface 21, a received data memory for storing the data received through the packet interface 21, a switching-system-dedicated interface 24 dedicated to the switching system 30, and a CPU 25 for controlling the overall operation of the constituent elements in the web server 20.

The switching system 30 includes a web-server-dedicated interface 31 dedicated to the web server 20, a first memory 32 for storing the telephone number of the extension and the terminal ID of the communication terminal 10 connected to the switching system 30, a second memory 33 for storing a table for tabulating the telephone numbers, received data and the extension numbers in association, a connection monitor 34 for monitoring the state of connections, a trunk interface block 35 for connecting to the circuit-switched network 60, a line interface block for connecting to the extensions 40 accommodated in the switching system 30, a switch array for establishing or breaking the paths between the trunk interface block 35 and the line interface block 36, and a CPU 38 for controlling the overall operations of the constituent elements in the switching system 30.

The connection monitor 34 monitors the state of the trunk interface block 35 and the line interface block 36 as to whether these interface blocks 35 and 36 are "idle" or "busy", monitors the data transferred between the terminal and the extension then connected through the trunk interface 35 and the line interface 36, and also monitors the subsequent recovery of the trunk interface 35 and the line interface 36.

For description of operation of the telecommunication system of FIG. 1 with reference to FIGS. 2 and 3A to 3C, an exemplified case is assumed here wherein a client having a communication terminal 10 wishes to originate a call onto an extension 40 of a consultation post in an insurance company through the web server 20 and the switching system 30 of the insurance company. The operation will be described hereinafter in separate five procedures.

In the first procedure, the client connects the own terminal 10 to the web server 20 via the internet packet communication network 50 and receives the information of the telephone number through which the client wishes to consult the insurance company. This first procedure is similar to that of display of a web page on a display unit of a personal computer by using transmission control protocol/internet protocol (TCP/IP) and HTML or HDML (handheld device markup language).

More specifically, in the first procedure, the client connects the own terminal 10 to the web server 20 through the packet interface 11 and the internet packet communication network 50 (step S1), thereby transmitting packet data (step S2), which includes ID number of the own terminal 10 (terminal ID) and requests transmission of initial screen data. The packet data received by the web server 20 from the communication terminal 10 is stored in the received data memory hardware 23. The CPU 25 extracts the terminal ID from the data stored in the received data memory 23 (step S3).

The CPU 25 of the web server 20 then creates a guidance screen packet data for the communication terminal 10 based on the terminal ID and the guidance screen data stored in the transmission data memory 22 (step S4), transmitting the resultant guidance screen packet data to the packet interface 21 as the initial screen data. The packet interface 21 then transmits the guidance screen packet data to the packet interface 11 of the communication terminal 10 via the internet packet communication network 50 (step S5). The CPU 18 of the communication terminal 10 reads the guidance screen packet data received through the packet interface 11, thereby allowing the web browser 12 to display the guidance menu list (initial menu list) on the display unit 13 (step S6).

In FIG. 3A, there is shown a guidance menu image together with the compact HTML tags used therefor. The guidance menu list has a title "xxx Automobile Insurance Web Guidance", several menus including "Guidance to Consultation Post", "Guidance to Contents Of Contract" and "Receipt of Accident Information", and messages such as urging the client to select one of the menus.

The client inputs the menu number, "1", using the keyboard 14 to select one of the menus on the initial screen, to specify the consultation post in the insurance company to which the client wishes to connect (step S7). The web browser 12 recognizes the menu number specified by the client, assembles the menu number into packet data, and delivers the packet data to the packet interface 11. The packet data including the information of the menu number, which is referred to as "destination specifying packet data" hereinafter, is transmitted to the packet interface 21 of the web server 20 via the internet packet communication network 50 (step S8).

The CPU 25 of the web server 20 stores the destination specifying packet data received by the packet interface 21 into the received data memory 23. The CPU 25 thus recognizes the terminal ID and the post of the insurance company to which the client wishes to connect.

The second procedure is such that the CPU 25 of the web server 20 receives the telephone number of the post, to which the client wishes to consult, from the switching system 30.

The CPU 25 delivers a destination number request data, which includes the terminal ID stored in the received data memory 23 and the destination information (or post information) obtained from the destination specifying packet data, to the switching-system-dedicated interface 24 (step S9). The destination number request data is delivered from the switching-system-dedicated interface 24 to the CPU 38 of the switching system 30 through the web-server-dedicated interface 31 (step S10).

The CPU 38 of the switching system 30 stores the ID number within the destination number request data into the first memory (or destination number/terminal ID memory) 32. The CPU 38 then extracts, based on the destination number information within the destination number request data, a trunk interface from the trunk interface block 35 which is capable of accepting the call request and a line interface which accommodates the specified extension 40 and is capable of accepting the call request, recognizes the telephone number of the extension to which these extracted interfaces 35 and 36 can be connected via the circuit-switched communication network 60, and then stores the telephone number as the destination number in the first memory 32 in association with the terminal ID (step S11).

These terminal ID and the destination number are transmitted in combination by the CPU 38 of the switching system 30 through the web-server-dedicated interface 31 to the switching-system-dedicated interface 24 of the web server 20 (step S12). Thus, the web server 20 recognizes the telephone number for connecting the consultation post of the insurance company to the communication terminal 10 of the client.

The third procedure is such that the CPU 25 of the web server 20 displays the telephone number of the consultation post of the insurance company on the display unit 13 of the communication terminal 10, the telephone number being received from the switching system 30.

The CPU 25 of the web server 20 creates, based on the destination number received through the switching-system-dedicated interface 24, a connection acceptance screen data indicating whether or not the destination number is allowed for connection. The CPU 25 then assembles the connection acceptance screen data into the connection acceptance packet data, which is to be transmitted to the communication terminal 10, based on the received terminal ID, and delivers the resultant packet data to the packet interface 21 (S13).

The connection acceptance packet data is delivered from the packet interface 21 via the internet packet communication network 50 to the packet interface 11 of the communication terminal 10 (step S14). The CPU 18 of the communication terminal 10 receives the connection acceptance packet data through the packet interface 11, and delivers the same to the web browser 12, which displays the image of the connection acceptance packet data on the display unit 13 (step S15).

FIG. 3B shows the connection acceptance screen after the client selects the menu #1 in the initial screen. The screen includes a title "xxx Automobile Insurance Web Attendant", telephone number "0471-XX-XXXX" of the consultation post to which the client wishes to connect, a pair of select buttons, and a message to urge the client to select one of the buttons for selecting connection or no-connection. Thus, the third procedure allows the telephone number of the consultation post to be displayed on the display unit 13 of the communication terminal 10.

The fourth procedure is such that the client originates a call onto the switching system 30 based on the connection acceptance screen.

The client recognizes the telephone number of the consultation post on the connection acceptance screen displayed on the display unit 13, selects the button "yes" by using the keyboard 14 or mouse to thereby instruct connection to the destination number of the consultation post (step S16). The compact HTML tag for connection to the destination number is "<A href="tel:0471-xx-xxxx"". This tag is set on the button so that the button selected by the client allows the line controller 15 of the communication terminal 10 to originate a call onto the switching system 30 via the line interface 16 (step S17).

The fifth procedure is such that the switching system 30 switches the call from the communication terminal 10 to the telephone number of the consultation post of the insurance company.

The connection monitor 34 of the switching system 30 monitors all the trunk interfaces in the trunk interface block 35 and the line interfaces in the line interface block 36 accommodated in the switching system 30, whereby the CPU 38 of the switching system 30 recognizes the presence of call-in to the trunk interface block 35.

The CPU 38, when notified of the presence of the call-in to the trunk interface block 35 by the connection monitor 34, compares the location of the trunk interface receiving the call-in and the received data received through the trunk interface during the call-in against the destination number/ received data/extension number of the table stored in the second memory 33, to thereby recognize the destination number specified from the communication terminal 10 and the extension number to be connected. Thus, the CPU 38 delivers a ringing call onto the extension 40 of the specified telephone number.

In addition, the CPU 38 transmits, to the web-server-dedicated interface 31, the terminal ID obtained by comparing the destination number recognized here against the data stored in the first memory 32 for the destination number (step S19) and the information of ringing the extension 40, the information being referred to as an "extension ringing signal" hereinafter.

The web-server-dedicated interface 31 of the switching system 30 transmits the terminal ID and the extension ringing signal to the switching-system-dedicated interface 24 of the web server 20 (step S20). The CPU 25 of the web server 20 assembles the extension ringing signal received from the switching-system-dedicated interface 24 into a extension ringing packet data, and delivers the extension ringing packet data to the packet interface 21 through the transmission data memory 22 (step S21).

The extension ringing packet data is transmitted through the internet packet communication network 50 to the packet interface 11 of the communication terminal 10 (step S22). The CPU 18 of the communication terminal 10, after receiving the extension ringing packet data, allows the web browser 12 to display the data in the extension ringing packet data which is specified for display by the switching system 30 (step S23).

Referring to FIG. 3C, there is shown a screen of the display unit during the step S23. The screen displays a title "xxx Automobile Insurance Web Attendant", and messages such as including "ringing to consultation post" and "please wait in a telephone mode".

When the extension 40 of the consultation post answers the ringing for call-in, the CPU 38 of the switching system 30 is notified of the answer of the extension 40 from the connection monitor 34, controls the switch array 37 to connect the path between the specified line interface in the line interface block 36 and the specified trunk interface in the trunk interface block 35 (step S24).

Thus, the path between the extension 40 and the communication terminal 10 is established through the switching system 30 and the circuit-switched communication network 60, whereby the client can talk with a person at the extension of the consultation post (step S25).

As described above, the web server 20 has functions of instructing the switching system 30 to specify an idle extension based on the data received from the communication terminal 10 connected to the web server 20, receiving from the switching system 30 the destination number of the idle extension thus specified, transmitting the destination number of the idle extension to the communication terminal 10, and urging the communication terminal 10 to originate a call onto the idle extension of the specified destination number transmitted to the communication terminal 10.

In addition, the switching system 30 has functions of specifying an idle line to be connected to the destination number based on the destination specifying request data received from the web server 20, extracting a telephone number to be used by the communication terminal 10, notifying the destination telephone number and the terminal ID in combination to the web server, and extracting the terminal ID of the communication terminal 10 connected to the switching system 30 based on the data received through the interface.

By the functions of the web server 20 and the switching system 30, the client can obtain from the initial screen the telephone number of the idle extension for the consultation post to which the client wishes to consult, and connect the idle extension simply by selecting the button on the screen of the display unit. This allows the client to obviate the input operation for the telephone number to which the client wishes to connect. In addition, the message can be displayed on the screen of the display unit such as indicating that the called extension is ringing. This allows the client to be ready for answer from the extension. The ringing information may be replaced by or added to any other information such as the information of the consultation post.

Since the above embodiments are described only for examples, the present invention is not limited to the above embodiments and various modifications or alterations can be easily made therefrom by those skilled in the art without departing from the scope of the present invention.

What is claimed is:

1. A telecommunication system comprising:

a web server and a switching system disposed in combination for data transmission therebetween, said switching system accommodating therein a plurality of extensions, said web server storing therein first screen data for specifying therein at least one menu having post information and second screen data; and a plurality of communication terminals each including a packet interface connected to said web server via an internet packet communication network and a line interface connected to said switching system via a circuit-switched communication network, each of said communication terminals including a display unit, a web browser for accessing said web server to receive therefrom said first and second screen data to be displayed on said display unit, and an input section for specifying said menu on said display unit, said web browser transmitting to said web server information of said menu specified by said input section, said web server including a data transfer section for transferring to said switching system information of said menu specified by said input section, said switching system including a connection monitor for monitoring connection state of said extensions to select one of said extensions based on said information of said menu specified and transmit to said web server a telephone number of said selected one of said extensions to be included in said second screen data, said browser urging a client to originate a call onto said telephone number in said second screen data.

2. The telecommunication system as defined in claim 1, wherein said web server transfers to said each of said communication terminals third screen data including ringing information of said selected one of said extensions.

3. The telecommunication system as defined in claim 1, wherein said switching system establishes a path between said circuit-switched communication network and said selected one of said extensions based on information of selection of said telephone number.

4. A method for controlling a telecommunication system including at least one combination of a web server and a switching system, said web server being connected to a plurality of communication terminals via an internet packet communication network, said switching system being connected to said plurality of communication terminals via a circuit-switched communication network and accommodating a plurality of extensions, said method comprising the steps of:

allowing said web server to display first screen data on a display unit of one of said communication terminals, and first screen data including information of at least one post;

allowing said web server to receive first information that said post is specified in said first screen data, and to transfer said first information to said switching system;

allowing said switching system to extract one of said extensions corresponding to said specified post based on said first information, and to transmit a telephone number of said one of said extensions to said web server;

allowing said web server to display second screen data including information of said telephone number on said display unit of said one of said communication terminals; and urging a client to originate a call onto said telephone number in said second screen data via said circuit-switched communication network and said switching system.

5. The method as defined in claim 4, further comprising the step of allowing said web server to transmit third screen data third screen data to said one of said communication terminals, said third data including information that said one of said extensions is ringing.

6. The method as defined in claim 4, further comprising the steps of allowing said switching system to establish a path between said circuit-switched communication network and said one of said extensions.

7. A telecommunication control system comprising:

a web server and a switching system disposed in combination for data transmission therebetween, said switching system accommodating therein a plurality of extensions, said web server storing therein first screen data for specifying therein at least one menu having post information and second screen data, said web server being connected to a plurality of communication terminals via an internet packet communication network, said switching system being connected to said plurality of communication terminals via a circuit-switched communication network, said web server including:

a data transmission section for transmitting said first and second screen data to be displayed on a display unit of one of said communication terminals, said first screen data urging a client to specify said menu on said display unit, said data transmission section receiving information of said menu specified from said one of said communication terminals to transfer said information of said menu specified to said switching system, said switching system monitoring connection of said extensions to select one of said extensions based on said information of said menu specified and transmit to said web server a telephone number of said selected one of said extensions to be included in said second screen data, said web server transferring said second screen data to said one of said communication terminals to urge a client to originate a call onto said telephone number in said second screen data via said switching system and said circuit-switched communication network.

8. The telecommunication control system as defined in claim 7, wherein said web server transfers to said one of said communication terminals third screen data including ringing information of said selected one of said extensions.

9. The telecommunication control system as defined in claim 7, wherein said switching system establishes a path between said circuit-switched communication network and said selected one of said extensions based on information of selection of said telephone number.

\* \* \* \* \*